United States Patent [19]

Marion

[11] 3,920,717

[45] Nov. 18, 1975

[54] PRODUCTION OF METHANOL

[75] Inventor: Charles P. Marion, Mamaroneck, N.Y.

[73] Assignee: Texaco Development Corporation, New York, N.Y.

[22] Filed: Mar. 26, 1973

[21] Appl. No.: 345,144

[52] U.S. Cl............................ 260/449.5; 252/373
[51] Int. Cl.²......................................... C07C 29/16
[58] Field of Search........................ 252/373, 449.5

[56] References Cited
UNITED STATES PATENTS

| | | | |
|---|---|---|---|
| 1,754,371 | 4/1930 | Stengel | 260/449.5 |
| 2,863,527 | 12/1958 | Herbert et al. | 252/373 UX |
| 2,964,551 | 12/1960 | Woolcock | 260/449.5 |
| 3,064,029 | 11/1962 | White | 260/449.5 |
| 3,071,453 | 1/1963 | James | 260/449.5 X |
| 3,074,783 | 1/1963 | Paull | 252/373 UX |
| 3,232,728 | 2/1966 | Reynolds | 48/215 |
| 3,326,956 | 6/1967 | Davies et al. | 260/449.5 |
| 3,501,516 | 3/1970 | Parrish | 260/449.5 |
| 3,709,669 | 1/1973 | Marion et al. | 252/373 |
| 3,723,345 | 3/1973 | Reynolds | 252/373 |

FOREIGN PATENTS OR APPLICATIONS

| | | | |
|---|---|---|---|
| 2,024,301 | 12/1971 | Germany | 260/449.5 |
| 1,580,390 | 9/1969 | France | 252/373 |
| 1,159,035 | 7/1969 | United Kingdom | 260/449.5 |

Primary Examiner—Howard T. Mars
Attorney, Agent, or Firm—T. H. Whaley; C. G. Ries; Albert Brent

[57] ABSTRACT

A continuous process for producing methanol including the steps of producing synthesis gas i.e. $H_2 + CO$ by the partial oxidation of a hydrocarbonaceous feed in a free-flow non-catalytic synthesis gas generator, adjusting the mole ratio ($H_2/CO$) of the process gas stream to a value in the range of about greater than 2 to 12 by noncatalytic thermal direct water-gas shift, cooling the process gas stream by indirect heat exchange with water to produce steam for use in the process, purifying the gas stream preferably with a portion of the methanol product, catalytically reacting the purified synthesis gas stream under methanol producing conditions, and separating methanol from liquid impurities. All steps are preferably carried out at a pressure which is substantially that in the synthesis gas generator less ordinary line drop. Optionally, a portion of the liquid impurities e.g. dimethylether, water, and mixed alcohols, are introduced into the synthesis gas generator to reduce the specific consumption of free-oxygen gas and to increase the yield of synthesis gas.

18 Claims, 1 Drawing Figure

PRODUCTION OF METHANOL

BACKGROUND OF THE INVENTION

1. Field of the Invention

This invention relates to a continuous process for the production of methanol.

2. Description of the Prior Art

Output of methanol in the United States is close to a thousand million gallons annually. About 55% of this output will be converted to formaldehyde which is used primarily for making synthetic plastics and resins e.g. urea-formaldehyde, phenol-formaldehyde and melamine-formaldehyde. Methanol is also used in the synthesis of a variety of chemicals including dimethyl toluene, methyl amines, chlorinated solvents, acetic acid, and isoprene.

A part of the world production of methanol is derived from natural gas or naphtha by means of high pressure processes (270–400 atmospheres) which generally operate at a temperature in the range of about 570° to 750°F. and with a zinc-chromium catalyst. In prior art high pressure processes, capital and maintenance costs for high pressure centrifugal and reciprocating compressores are significant. Low pressure methanol synthesis processes which use a copper base catalyst e.g. copper oxide with some zinc and chromium oxides have been developed. Low pressure processes operate at a pressure in the range of about 40–110 atmospheres and at a temperature in the range of about 400°–700°F.

Lower operating pressures result in a considerable reduction in the cost of compression equipment and in steam generation facilities for the compressor drive. Other advantages of low pressure operation include thinner wall construction, and improved selectivity and yield. Disadvantages of the low pressure processes include larger equipment size, larger gas volumes handled per unit weight of methanol produced and higher catalyst costs due to lower space velocity and shorter life. Finally, higher feedstock and synthesis gas purities are required to prevent catalyst contamination. The subject process is operable over low intermediate, and high pressure ranges. Expensive gas compressors are unnecessary. Costly water-gas shift catalysts are eliminated. The subject process combines the advantages of both low and high pressure operation.

SUMMARY

The subject process pertains to a continuous catalytic process for synthesizing methanol. The feedstock to the catalytic chamber is synthesis gas e.g. principally comprising $H_2$ and CO as derived from the partial oxidation of a hydrocarbonaceous fuel in a free-flow noncatalytic refractory lined synthesis gas generator. Supplemental $H_2O$ is added to the effluent gas stream from the gas generator and by noncatalytic thermal direct water-gas shift reaction, the mole ratio ($H_2$/CO) of the process gas stream is adjusted to a ratio in the range of about greater than 2.0 to 12. The process gas stream is preferably cooled by indirect heat exchange with water to produce substantilly all of the steam requirements in the system. For example, steam is used in the gas generator, steam turbines, and reboilers. The process gas stream is purified preferably with a portion of the methanol product and then catalytically reacted under methanol producing conditions. Methanol is separated from water, dimethyl ether (DME) and other liquid impurities such as mixed alcohols. Optionally, a portion of the DME and other liquid impurities are introduced into the synthesis gas generator to produce additional synthesis gas and to reduce the specific consumption of free-oxygen gas. Preferably, all steps through the methanol synthesis are carried out at substantially the same pressure as that in the synthesis gas generator, less ordinary line drop.

DESCRIPTION OF THE INVENTION

The present invention pertains to an improved continuous process for the synthesis of methanol by the catalytic reaction of a gaseous mixture principally comprising hydrogen and carbon monoxide and generally referred to as synthesis gas.

Figure 1:
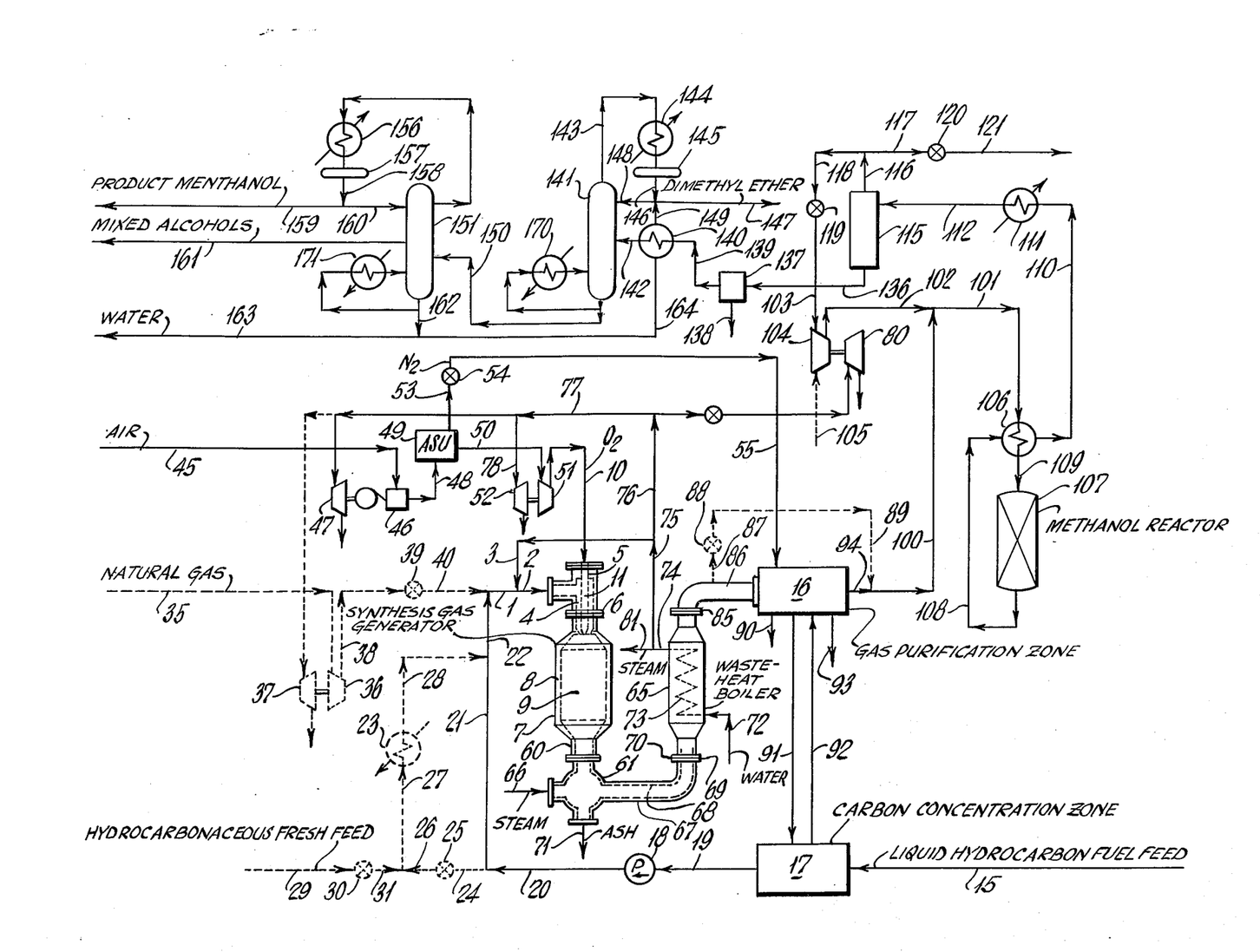

In the subject process, first a continuous stream of synthesis gas is produced in the refractory lined reaction zone of a free-flow unpacked noncatalytic partial oxidation fuel gas generator. The gas generator is preferably a vertical steel pressure vessel such as shown in the drawing and described in coassigned U.S. Pat. 2,992,906 issued to F. E. Guptill, Jr.

A wide range of combustible carbon containing organic materials may be reacted in the gas generator with a free-oxygen containing gas and preferably in the presence of a temperature-moderating gas to produce the fuel gas.

The term hydrocarbonaceous, as used herin to describe various suitable feedstocks, is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous". For example, there are (1) pumpable slurries of solid carbonaceous fuels, such as coal, particulate carbon, petroleum coke, concentrated sewer sludge; and mixtures thereof; (2) gas-solid suspensions, such as finely, ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 6 weight percent and an ash content in the range of about 0 to 20 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand and shale oil, coal oil aromatic hydrocarbons (such as benzene, toluene, xylene fractions) coal tar, cycle gas oil from fluid-catalytic-cracking operation; furfural extract of coker gas oil; and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphtenic and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it may be preheated to a temperature up to as high as about 600°F. to 1200°F., but preferably below its cracking temperature. The hydrocarbonaceous feed may be introduced into the burner in liquid phase of in a vaporized mixture with a temperature moderator. Suitable temperature moderators include $H_2O$, $CO_2$, by-product nitrogen from the air separation unit to be further described, flue gas, off-gas from an ore-reduction zone, a portion of cooled and recycled effluent gas from the synthesis gas generator, and mixtures thereof. $H_2O$ is the preferred temperature moderator.

The use of a temperature moderator to moderate the temperature in the reaction zone is optional and depends in general on the carbon to hydrogen ratio of the feedstock and the oxygen content of the oxidant stream. For example, a temperature moderator is generally not used with gaseous hydrocarbon fuels; however, generally one is used with liquid hydrocarbon fuels and with substantially pure oxygen. As previously mentioned, the temperature moderator may be introduced in admixture with either or both reactant streams. Alternatively, the temperature moderator may be introduced into the reaction zone of the gas generator by itself via a separate conduit in the fuel burner.

When, for example, $H_2O$ is charged to the reaction zone, it may be in liquid or gaseous phase. it may be in the form of steam or water droplets. Further, the $H_2O$ may be mixed either with the hydrocarbonaceous feedstock or with the free-oxygen containing gas, or with both. For example, a portion of the steam may be intermixed with the oxygen stream in an amount less than about 25 weight percent of the oxygen and any remainder mixed with hydrocarbonaceous materials. The $H_2O$ may be at a temperature in the range of ambient to 1000°F., or more. The weight ratio of water to hydrocarbonaceous feed may be in the range of about 0.0 to 1.0.

The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and rare gases). Free-oxygen containing gas may be introduced into the burner at a temperature in the range of about ambient to 1800°F. The ratio of free-oxygen in the oxidant to carbon in the feedstock (O/C atom/atom) is preferably in the range of about 0.7 to 1.5. Substantially pure oxygen is preferred to minimize introducing nitrogen and other gaseous impurities into the synthesis gas. In one embodiment of the invention, at least a portion of the liquid impurities e.g. dimethyl ether, water and mixed alcohols are introduced into the synthesis gas generator. By this means the O/C ratio may be reduced for a given soot level, and additional synthesis gas is produced.

The feedstreams are introduced into the reaction zone of the gas generator by means of fuel burner. Suitably, an annulus-type burner, such as described in coassigned U.S. Pat. No. 2,928,460 issued to duBois Eastman et al, may be employed.

The feedstreams are reacted by partial oxidation without a catalyst in the reaction zone of a free-flow gas generator at an autogenous temperature in the range of about 1500° to 3500°F. and at a pressure in the range of about 20 to 450 atmospheres. The reaction time in the gas generator is about 1 to 10 seconds. The mixture of effluent gas leaving the gas generator may have the following composition in mole %:

$H_2$, 30–70; CO, 60–20; $CO_2$, 3–8; $H_2O$, 5–15; $CH_4$, 0.2–15; $N_2$ 0–60; $H_2S$, 0–2; COS, 0 to 0.2; and A, 0–2.

Unreacted particulate carbon (on the basis of carbon in the feed by weight) is about 0.2 to 20 weight percent from liquid feeds but is usually negligible from gaseous hydrocarbon feeds. The mole ratio ($H_2$/CO) of the effluent gas from the generator is in the range of about 0.5 to 2.0.

The stream of hot effluent gas leaving the gas generator is passed into a separate refractory lined free-flow steel chamber where some of the entrained solids are removed and adjustment of the mole ratio ($H_2$/CO) is effected. Preferably the process gas stream is at a temperature in the range of about 1600° to 3500°F. as produced in the gas generator and at the same pressure as in the gas generator e.g. 20 to 450 atmospheres, preferably 60 to 150 atmospheres, and suitably 205 to 450 atmospheres. A chamber as shown in coassigned U.S. Pat. No. 3,565,588 may be used. For example, spherical chamber 61 shown in the drawing is unpacked and free from catalyst or obstruction to the flow of gas there-through. A portion of the solid matter that may be entrained in the process gas stream may drop out and may be removed through an outlet located at the bottom of the spherical chamber which leads to a lock hopper.

A stream of supplemental $H_2O$, as produced subsequently in the process is simultaneously introduced into the spherical chamber at a temperature in the range of about 500° to 1500°F. and at a pressure slightly above that in the gas generator. On a dry basis, about 0.1 to 2.5 moles of supplemental $H_2O$ are preferably introduced into the spherical chamber per mole of effluent synthesis gas from the gas generator where the gases mix. Alternatively, the supplemental $H_2O$ may be introduced into the separate noncatalytic unobstructed thermal shift conversion zone in admixture with the effluent synthesis gas from the gas generator. By noncatalytic thermal direct water-gas shift reaction at a temperature of at least 1500°F., and preferably in the range of about 1500°F. to 2800°F., the supplemental $H_2O$ reacts with a portion of the carbon monoxide in the effluent synthesis gas stream from the generator so as to produce additional $H_2$ and $CO_2$. The mole ratio ($H_2$/CO) of the effluent stream of gases from the gas generator may be increased by this step to a value in the range of about greater than 2.0 to 12 or more, and preferably in the range of about 2.3 to 6.0. The aforesaid high temperature adiabatic noncatalytic thermal direct water-gas shift reaction may begin for example in the insulated spherical chamber. The shift reaction continues in an insulated line connecting the side outlet of the spherical chamber with the bottom flanged inlet to a waste heat boiler. Thus, the effluent stream of synthesis gas is thermally shifted without a catalyst in transit between stages in the process. Residence time in the water gas shift conversion zone is in the range of about 0.1 to 5 seconds. See coassigned U.S. Pat. No. 3,723,345.

preferably, the conditions of temperature and pressure at which the noncatalytic thermal direct water-gas shift reaction takes place are substantially the same as those in the synthesis gas generator, less ordinary line drop and less any cooling due to the sensible heat of the supplemental $H_2O$ and any heating due to the heat of reaction. However, in another embodiment of the invention, effluent gas leaving the gas generator is quenched in water to a temperature in the range of about 400° to 900°F. The process gas stream is thereby scrubbed substantially free from entrained particulate carbon and other solids. Steam is vaporized into the process gas stream and additional water may be then introduced so as to provide the required amount of supplemental $H_2O$ necessary for the noncatalytic thermal direct water-gas shift reaction which takes place after the process gas stream is heated in a separate heater to a temperature in the range of about 1500° to 2800°F.

After noncatalytic thermal direct water-gas shift, the process gas stream is passed through an inline waste heat boiler in noncontact heat exchange with water. The stream of synthesis gas is thereby cooled to a temperature in the range of about 400° to 900°F. By-product saturated steam may be produced thereby at a pressure normally in the range of about 25 to 1500 psi above the pressure of the synthesis gas for use elsewhere in the process. Substantially all of the steam requirements in the system maybe therefore met. For example, the aforesaid steam may be used as a working fluid in an expansion turbine for the production of power. The steam turbine may be used to drive the air and oxygen compressors in a conventional air separation unit, the recycle gas compressor in the methanol synthesis loop to be further described, or the feed gas compressor if any. Preferably, a portion of the steam may be introduced into the gas generator as at least a portion of the temperature moderator and into the thermal shift reactor as a reactant. It may also be used to provide heat in a reboiler in a methanol or DME distillation column.

The partially cooled stream of synthesis gas leaving the waste heat boiler is passed into a gas purification zone where gaseous impurities and any remaining entrained solids and particulate carbon may be removed. Slurries of particulate carbon in a liquid hydrocarbon may be produced in the gas cleaning section of the purification zone. It is economically desirable for said slurries to be recycled to the gas generator as at least a portion of the feedstock. Any conventional procedure suitable for removing suspended solids from a gas stream may be used. In one embodiment of the invention the stream of synthesis gas is introduced into a gas-liquid scrubbing zone where it is scrubbed with a scrubbing fluid, such as liquid hydrocarbon or water. A typical liquid-gas tray-type contacting column is more fully described in Perry's Chemical Engineers' Handbook, Fourth Edition, McGraw Hill 1963, Pages 18–3 to 5.

Thus, by passing the stream of process synthesis gas up a scrubbing column in direct contact and counter flow with a hydrocarbon scrubbing fluid or with dilute mixtures of particulate carbon and scrubbing fluid flowing down the column, the particulate carbon may be removed from the synthesis gas. A slurry of particulate carbon and scrubbing fluid is removed from the bottom of the column and sent to a carbon separation or concentration zone. Carbon concentration may be effected by any suitable conventional means e.g. filtration, centrifuge, gravity settling, or by liquid hydrocarbon extraction such as the process described in the previously mentioned coassigned U.S. Pat. No. 2,992,906. Clean scrubbing fluid or dilute mixtures of scrubbing fluid and particulate carbon may be recycled to the top of the column for scrubbing more synthesis gas, as shown in coassigned U.S. Pat. No. 3,709,669, Marion et al.

Other suitable conventional gas cooling and cleaning procedures may be used in combination with or in place of the aforesaid scrubbing column. For example, the stream of fuel gas may be introduced below the surface of a pool of quenching and scrubbing fluid by means of a dip-tube unit. On the stream of fuel gas may be passed through a plurality of scrubbing steps including an orifice-type scrubber or venturi or nozzle scrubber, such as shown in Perry's Chemical Engineers'- Handbook, Fourth Edition McGraw-Hill 1963, pages 18–54 to 56 and coassigned U.S. Pat. No. 3,639,261 Slater.

Substantially no particulate carbon is produced with gaseous hydrocarbonaceous fuels such as natural gas or methane. In such case, the aforesaid gas scrubbing step may not be necessary.

Included in the gas purification zone preferably after the gas scrubbing section are means for removing as desired any of the following gaseous impurities when present in the process gas stream: $CO_2$, $H_2S$, COS, $CH_4$, A, $N_2$, $H_2O$, $NH_3$. Preferably, a portion of the $CO_2$ is allowed to remain in the process gas stream for improved temperature control within the methanol reactor. However, $CO_2$ consumes hydrogen by forming water. Thus, it may be desirable in some cases to by-pass part of the process gas stream around the gas purification zone or at least around some part of the zone after the soot scrubbing section so as to aid in adjusting the gas composition. The most economic design should be selected between (1) treating the entire shifted gas stream to remove a portion of the $CO_2$ or (2) treating only a portion of the stream to remove substantially all of the $CO_2$ from that portion and then admixing the treated portion with the untreated portion.

Any suitable conventional process may be used for purifying the process gas stream. Typical gas purification processes may involve refrigeration and physical or chemical absorption with a solvent, such as methanol, n-methyl-pyrrolidone, triethanolamine, propylene carbonate, or alternately with hot potassium carbonate.

Advantageously, when methanol is used as the solvent a portion of the product methanol may be used as make-up. For example, by scrubbing the synthesis gas with methanol under 300 atmospheres pressure the $CO_2$ content of the synthesis gas can be reduced to 1.0 or lower. At −10°C. and 10 atmospheres 100 volumes of $CO_2$ are absorbed per volume of methanol. This is increased to 270 vol/vol at −30°C. At a high partial pressure of $CO_2$ e.g. 250 psi, methanol offers a higher absorption power than any other known solvent. Similarly, cold methanol is an excellent selective solvent for separating $H_2S$ and COS from $CO_2$. In the Rectisol system by Lotepro Corporation, New York, the gas stream is washed with cold methanol and the total sulfur, $H_2S$ + COS may be easily reduced to less than 0.1 ppm. By selective absorption of $H_2S$ and COs a high sulfur containing off-gas is obtained that contributes toward economical sulfur recovery. In a second state substantially all $CO_2$ is removed to produce a purified process gas stream containing less than 5 ppm $CO_2$.

In solvent absorption processes, most of the $CO_2$ absorbed in the solvent may be released by simple flashing. The rest may be removed by stripping. This may be done most economically with nitrogen. Nitrogen may be available as a low cost by-product when a conventional air separation unit is used for producing substantially pure oxygen (95 mole % $O_2$ or more) for use as the free-oxygen containing gas in the synthesis gas generator. The regenerated solvent is then recycled to the absorption column for reuse. When necessary, final cleanup may be accomplished by passing the process gas stream through iron oxide, zinc oxide, or activated carbon to remove residual traces of $H_2S$ or organic sulfide.

Similarly, the $H_2S$ and COS containing solvent may be regenerated by flashing or by stripping with nitrogen or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 352. Excess $SO_2$ may be removed and discarded in chemical combination with limestone, or by means of a suitable commercial extraction process.

From about 30 to 95% of the carbon dioxide may be removed from the process gas stream along with substantially all of the $H_2S$ by an autorefrigeration process. For example, references is made to coassigned U.S. Pat. No. 3,614,872 wherein a stream of shifted synthesis gas is separated into an enriched hydrogen product stream and an enriched carbon dioxide stream by counter-current cooling with a departing stream of liquid $CO_2$ which is expanded and vaporized to produce low temperature.

A $CO_2$ content of about 2 to 12 mole % in the feed gases is suitable. Preferably, the mole % $CO_2$ in the feed gas to the methanol reactor is less than 12 and greater than 8. The ratio of $H_2/2CO + 3CO_2$ is preferably less than 1.05 and greater than 1.01. The greater molar specific heat of carbon dioxide relative to carbon monoxide and the lower heat of reaction of $CO_2$ in the methanol reaction provide a more uniform temperature control in the methanol reactor, and the life of the catalyst is increased. It also appears to be beneficial in repressing the formation of dimethyl ether.

The stream of clean and purified synthesis gas from the gas purification zone at a temperature in the range of about 400° to 750°F. and at a pressure in the range of about 20 to 450 atmospheres and preferably substantially equal to the pressure in the reaction zone of the synthesis gas generator, less ordinary line drop is optionally mixed with unconverted recycle gases from the methanol reactor in the amount of 0 to 10 moles of recycle gas per mole of fresh clean and purified synthesis gas, and preferably in the mole ratio of one mole of fresh gas feed to 3 to 8 moles of recycle gas. The recycle gas may be compressed by means of a steam turbine circulating compressor driven by steam produced in the waste heat boiler located downstream from the synthesis gas generator. Optionally, a stream of available supplemental hydrogen-rich gas e.g. 60 mole % $H_2$ or more from an external source may be introduced into the suction side of the circulating compressor to adjust the $H_2/CO$ ratio of the gas stream. In such case depending on the analysis of the effluent gas from the gas generator, except for possible soot-scrubbing, purifying the process gas stream may be greatly simplified or omitted. The mixture of gases is preheated to a temperature in the range of about 400° to 750°F. as required in the methanol reactor by indirect heat exchange with the hot effluent stream leaving the methanol reactor. The preheated feed gas is then reacted in the catalytic methanol reactor.

Any suitable conventional catalytic methanol reactor may be employed, including single and multibed catalytic reactors. For example, reference is made to coassigned U.S. Pat. 3,666,423 Muenger, in which two sets of heat exchangers are imbedded in a catalyst and there is heat exchange between fresh and reacted gases. The feed stream is passed first through the inside of the heat exchangers and is preheated by indirect heat exchange with gases reacting on the outside of the heat exchangers. The preheated feed stream is then passed through the catalyst on the outside of the heat exchangers where said exothermic reaction takes place. For a multibed reactor design, reference is made to French Pat. 1,497,109.

Any suitable conventional methanol catalyst may be used e.g. selected from the group consisting of zinc oxide, copper oxide and mixtures thereof plus a promoter selected from the group of oxides consisting of magnesium, aluminum, chromium, and mixtures thereof. For example, for high pressure operation i.e. above 200 atmospheres, zinc and chromium oxides may be produced by treating aqueous zinc and chromium nitrate solutions with ammonium hydroxide to produce the hydroxide precipitates and then calcining the precipitates. Preferably, the Cr/Zn atomic ratio of the catalyst is in the range of about 0.5–1.5. While lower ratios result in lower conversions, they give better selectivity. For example, a zinc oxide catalyst containing 11 weight percent chromium oxide may yield methanol up to 99% purity at about 707°F. and 200 atmospheres. Suitable promoters for zinc and chromium oxides include magnesium, iron and mangnese.

Copper-containing catalysts generally have a higher activity and greater rate of reaction than that of zinc-chromium oxides. However, they have lower heat resistance, age poorly, and are highly sensitive to poisoning by sulfur, carbonyl-containing compounds, phosphorous and chlorine. A typical composition consists of 90 parts by weight of copper oxide and 10 parts chrome oxide. They are generally used for operation at low pressure e.g. less than about 110 atmospheres and temperatures below 700°F. 20–30% conversions may be obtained with alkali promoted copper catalysts at about 446°F., 100 atmospheres, and a space velocity of 10,000 standard cubic feet per hour (SCFH) per cubic foot of catalyst. Sulfur content of the synthesis gas should be less than 5 parts per million (ppm), preferably less than 2 ppm, and advantageously less than 0.1 ppm of sulfur.

Preferred compositions of ternary catalysts of copper, zinc, and chromium oxides as a percentage of metal atoms are in the range of: Cu, 90 to 20; Zn, 8 to 60; and Cr, 2 to 30. The catalyst may be prepared by coprecipitation from a nitrate solution by addition of a carbonate solution. The precipitate is washed, dried, and calcined at a temperature below 400°C. With a feed gas composition in mole % comprising $H_2$, 75; CO, 15; and $CO_2$, 10 reacting in contact with this catalyst at a temperature of about 482°F., and a pressure of about 50 atmospheres, and a space velocity in the range of about 16,000 to 25,000 $hr^{-1}$, about 15% of the CO in the fresh feed may be converted on the first pass to raw methanol containing less than about 0.5% organic impurities. Space velocities may range from about 10,000 to 50,000 SCF per cubic foot of catalyst per hour. The catalyst particle size may range from about 0.2 to 10 mm. Another suitable catalyst for the low pressure synthesis of methanol comprises copper-aluminum-zinc.

Methanol is produced in the catalytic reactor by the following reactions:

$$CO + 2H_2 \rightarrow CH_3OH \qquad (1)$$
$$CO_2 + 3H_2 \rightarrow CH_3OH + H_2O \qquad (2)$$

The effluent stream from the methanol reactor may have the following principal ingredients in mole %:

$CH_3OH$, 5 to 15; CO, 8 to 25; $H_2$, 40 to 80; $CO_2$, 3 to 12; $H_2O$, 0.5 to 15; and $(CH_3)_2O$, .05 to 0.6.

Minor amounts of mixed alcohols, aldehydes, and ketones may be present.

The effluent stream leaving the reactor at a temperature in the range of about 500° to 800°F. and a pressure in the range of about 20 to 450 atm. and preferably at the pressure in the synthesis gas generator less ordinary drop in the lines and equipment is cooled first by heat exchange with the inlet feed gas as previously mentioned. The gas stream is then cooled to condense crude methanol containing water, dimethyl ether, and oxidizable impurities. The condensate is introduced into a liquid-gas separation drum where the pressure may be let-down for example to 200 psig. Dissolved unreacted gases e.g. largely $CO_2$ and $H_2$ are released and a portion may be vented as fuel gas together with a purge gas stream designed to keep the concentration of inerts in the system low e.g. methane, nitrogen, and argon. Preferably, at least a portion of these unreacted gases may be mixed with fresh feed from the gas purification zone. By means of a recycle compressor the gas mixture is then heat exchanged with hot reacted effluent stream from the methanol reactor and introduced into the methanol reactor as feed as previously mentioned.

Oxidizable impurities of a carbonyl, aldehydic, or ketonic nature in the crude methanol impart an ojectionable odor or color. They may be removed by conventional means. For example, the crude methanol may be treated with potassium permanganate (0.02% KMnO4 + 0.1% $H_2SO_4$), peroxide or other suitable oxidizing agent, neutralized with sodium hydroxide and filtered. Treatment with ion-exchange resins and activated carbon may also be used.

Dimethyl ether (DME) comprising about 1–2 wt. % of the methanol production may be now separated from the crude methanol by extractive distillation with water for example in a 15 to 45-tray column at about 150 psig and a reflux ratio of about 20. In a second distillation column, for example, a 45 to 75-tray column at about 35 psig and a reflux ratio of about 1.5 to 2.0, water and higher alcohols may be separated to produce high purity methanol (99.8% and above). A portion of the overhead from the second column containing dimethyl ether and a portion of the water bottoms may be recycled to the first column. Reboiler steam for the two fractionation columns may be provided in part by the main waste heat boiler following the gas generator.

As previously mentioned, a portion of the product methanol may be introduced into the gas purification zone as make-up solvent. Similarly, any waste streams of organic liquids, which may contain combined oxygen e.g. mixed alcohols, DME, isobutanol, acetone and ethanol, may be disposed of advantageously be feeding them to the synthesis gas generator.

Methanol is made by the following steps in one embodiment of the subject invention employing sulfur free natural gas as the feed to the gas generator. The effluent gas from the gas generator is subjected to noncatalytic thermal direct water-gas shift to adjust the mole ratio ($H_2$/CO) to a value in the range of about 2.3–12, then passed in indirect heat exchange with water in a waste-heat boiler to produce steam for use elsewhere in the process, scrubbed with water to remove traces of particulate carbon, dried by conventional means (methanol injection or solid bed adsorbent) to remove entrained water, reduced in $CO_2$ content by conventional means (autorefrigeration such as by the process described in coassigned U.S. Pat. No. 3,614,872), mixed with unconverted recycle gas from the methanol reactor and said recycle gas, compressed by means of a steam turbine driven compressor with the steam produced in the aforesaid waste head boiler downstream from the gas generator, preheating said feed mixture by indirect heat exchange with the effluent stream leaving the methanol catalytic reactor, reacting said preheated feed mixture in said methanol reactor, separating crude methanol from the effluent stream from the methanol reactor, and purifying said crude methanol to produce pure product methanol.

DESCRIPTION OF THE DRAWING AND EXAMPLE

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described. Flow rates have been assigned to the various streams so that the description may also serve as an example.

On an hourly basis, with reference to the drawing about 49,117 pounds of hydrocarbonaceous feedstock in line 1 at temperature of 550°F. are mixed in line 2 with 19,310 lbs. of steam from line 3 at a temperature of 607°F. The mixture is passed through annulus 4 of annulus-type burner 5 mounted in the upper flanged inlet 6 of previously described free-flow noncatalytic partial oxidation synthesis gas generator 7 lined with refractory 8 and having a reaction chamber 9 of 160 cubic feet. Simultaneously, 52,150 lbs. of substantially pure oxygen (95.6 mole % $O_2$ or higher) in line 10 at a temperature of 300°F. are passed through center passage 11 of the burner.

In a preferred embodiment, the hydrocarbonaceous fuel feed to the gas generator is a slurry of particulate carbon in bunker fuel oil. The liquid hydrocarbon fuel oil preferably enters the system through line 15. The slurry comprises 857 lbs. of particulate carbon recovered downstream in gas purification zone 16 and concentrated in carbon concentration zone 17, to be further described, in admixture with 48,260 lbs. of said bunker fuel oil having a gross heating value of 17,710 BTU/lb. and 8.0°API. By means of pump 18, the slurry is passed through lines 19–22, 1, 2 and annulus 4. Alternatively, the slurry may be heated in heater 23 by being routed through line 24, valve 25, and lines 26–28. Alternatively, hydrocarbonaceous fresh feed to the gas generator may be introduced into the system via line 29, valve 30, and line 31. Alternatively, the feed to the gas generator may be a gaseous hydrocarbon such as natural gas. In such case fresh natural gas feed may be introduced into the system through line 35. It is then compressed by means of compressor 36 which is driven by steam turbin 37 and introduced into gas generator 7 by way of line 38, valve 39, and lines 40, 1, and 2.

The substantially pure oxygen in line 10 is preferably obtained from air entering the system through line 45.

The air is compressed in compressor 46 which is driven by steam turbine 47 and then passed through line 48 into a conventional air separation unit 49. Substantially pure oxygen leaves the air separation unit by way of line 50 and is compressed by compressor 51 which is driven by steam turbine 52 to a pressure of 111 atmospheres absolute. The compressed oxygen is passed through line 10 into burner 5 as previously described. A stream of by-product nitrogen leaves air separation unit 49 by way of line 53 and is optionally passed through valve 54 and line 55 into gas purification zone 16 where it may be used for cryogenic separation of gaseous impurities e.g. A, $CH_4$, and $CO_2$ from the process gas stream to be further described.

The pure oxygen, $H_2O$ and hydrocarbonaceous feed are mixed in reaction zone 9 of synthesis gas generator 7 and reacted by partial oxidation at an autogenous reaction temperature of about 2600°F. and a pressure of about 101 atmosphere absolute. The residence time in the reaction zone is about 2.8 seconds. 5,253,000 standard cubic feet per hour (SCFH) of effluent synthesis gas leave the gas generator by way of flanged bottom outlet 60, having the composition shown in Table I. Entrained in the effluent gas stream are 857 lbs. of particulate carbon per hour.

The effluent synthesis gas from the gas generator is introduced into a separate free-flow spherical connector 61 attached to flanged outlet 60. There it is mixed with 125,490 lbs. of supplemental steam produced at least in part in waste-heat boiler 65 at a temperature of 607°F. The supplemental steam is introduced into spherical connector 61 by way of line 66. The gaseous mixture leaving spherical chamber 61 is passed through transfer line 67. Both spherical chamber 61 and transfer line 67 are free from packing and catalyst and are thermally insulated with refractory 68. The downstream flanged end 69 of transfer line 67 is connected to flanged inlet 70 of main waste heat boiler 65. Some of the entrained solids and ash drop out of the process gas stream in spherical chamber 61 and leave the system by way of line 71 which is connected to a lock hopper (not shown).

As the process gas stream flows through spherical connector 61 and transfer line 67 at a temperature of at least 1500°F. noncatalytic thermal direct water-gas shift reaction takes place. That is, the supplemental $H_2O$ reacts with CO in the process gas stream to produce additional hydrogen and $CO_2$. Preferably, the reaction takes place under adiabatic conditions. The reaction time is less than 2 seconds. The mole ratio of $H_2/CO$ in the process gas stream is thereby preferably increased to about 3.0.

About 7,896,000 SCFH of shifted process gas stream (wet basis) are cooled in waste heat boiler 65 from a temperature of 1587°F. to a temperature of 697°F. but above the dew point by indirect heat exchange with water or steam. Boiler feed water in line 72 is passed through tubes 73 in waste heat boiler 65 and may be converted into steam at a temperature of 607°F. A water heat boiler of other suitable design may be used. The steam leaves by way of line 74 and may be used for substantially all of the steam requirements in the system, for example: as a temperature moderator in the gas generator by way of lines 75, 3, and 2; as the working fluid in steam turbine 52 by way of lines 75–78; and similarly as the working fluid in steam turbines 37, 47, 80 and others in the system not shown. Another portion of the steam may be passed through line 81 into line 66 for use as the supplemental $H_2O$ for the thermal water-gas shift as previously disclosed. Other areas of the system where the steam may be used include reboilers 170 and 171 and heater 23.

The partially cooled process gas stream leaves waste heat boiler 65 by way of upper flanged outlet 85 at a temperature of about 697°F., but above the dew point. The gas stream passing through connector 86 has a composition shown in Table I. This gas stream is passed into gas purification zone 16 where by conventional means as previously described, particulate carbon and gaseous impurities are removed and it is dried. Optionally, depending upon its purity and the desired $H_2/CO$ mole ratio, all or a portion of the gas stream may be made to by-pass all or some sections of the gas purification zone. This shown by line 87, valve 88, and line 89.

Thus, for example, in gas purification zone 16, the process gas stream may be first scrubbed with water in a gas scrubber (not shown) to remove entrained particulate carbon and to condense out water in the manner described in coassigned U.S. Pat. No. 2,992,906 — Guptill but not shown in the drawing. Excess water may be drawn off by way of line 90. A water-particulate carbon dispersion is produced and passed through line 91 to a decanter (not shown) in carbon concentration zone 17. There the dispersion is contacted with a light hydrocarbon such as naphtha to produce a naphtha-carbon slurry. Clear water is separated and recycled to the gas scrubber by way of line 92. The naphtha-carbon slurry is passed into a distillation column (not shown) in carbon concentration zone 17. Fresh bunker fuel oil feed in line 15 as previously described, is also introduced into the distillation column. Naphtha is removed from the top of the distillation column and recycled to the decanter. A preheated slurry of bunker fuel oil and particulate carbon from the bottom of the distillation column is passed through line 19 by pump 18 and into the synthesis gas generator as previously described.

Other gaseous impurities as required are removed in gas purification zone 16 in the manner previously described, and they are indicated as leaving through line 93. Preferably, the pressure in the gas purification zone is maintained at generator reaction zone pressure so that the purified process gas stream leaving by way of line 94 is substantially the same as that in synthesis gas generator 7 less ordinary line drop. Generally, the higher the pressure in gas purification zone 16, the greater the separation efficiency. The composition of the process gas stream in line 94 is shown in Table I.

The purified process gas stream is passed through line 100 into line 101 where it is mixed with the compressed recycle gas stream from line 102. The gas stream in line 103 that is compressed by circulating compressor 104 driven by steam turbine 80. In such case the composition of the gas stream in line 102 is the same as that in line 103, and is shown in Table I along with the composition in line 101. Alternatively, a hydrogen-rich gas from an external source may be introduced into the system by way of line 105 and compressed to line pressure by means of compressor 104. In the subject example a by-product stream of fuel gas substantially comprising in mole % $H_2$, 68.4; CO, 18.6 and $CH_4$, 2.10; is produced by selecting a purge rate of 20 mole % of the unconverted gases and a recycle ratio of 1.5 moles of unconverted gases from the methanol reactor per mole of fresh purified make-up gas. By reducing the purge rate to about 2 to 5 mole % and increasing the recycle ratio to a level of about 4 to 10 the conversion of carbon oxides to raw methanol may be increased to about 90% and higher. However, in the present example 2,370,000 SCFH of purified process gas stream from line 100 and 3,794,000 SCFH of recycle gas from line 102 are mixed in line 101 to produce the feed gas stream to the methanol reactor. The feed gas mixture in line 101 is heated to a temperature of 500°F. in heat exchanger 106 by heat exchange with hot reacted gases leaving methanol reactor 107 by way of line 108. The preheated feed stream enters methanol reactor 107 through line 109 where it is catalytically reacted under methanol producing conditions.

Methanol reactor 107 is filled with one or more beds of a suitable commercial methanol catalyst e.g. oxides of zinc, chromium, and copper in which the metal atoms are within the following limits Cu, 90 to 20; Zn, 8 to 60, and Cr, 2 to 30. A suitable space velocity e.g. 10,000 SCF of gas per hour and per cubic foot of catalyst, is selected to achieve an exit temperature of about 660°F. at a pressure of about 94 atmospheres and a single pass CO conversion of about 27%. Preferably, the pressure in the methanol reactor is substantially equal to the pressure in gas generator 7, less ordinary drop in the line and equipment.

The reacted gas stream leaving heat exchanger 106 through line 110 is passed into cooler 111. There it is cooled to a temperature low enough to condense out the normally liquid products. Then the stream of liquid and unconverted gases in line 112 is separated in vessel 115. Unconverted gases leave by way of overhead line 116 and are recycled to the methanol reactor by way of line 118, valve 119, line 103, recycle turbocompressor 104, lines 102, 101, heat exchanger 106, and line 109. Periodically to prevent the buildup of gaseous impurities in the system a portion of the unconverted gases in line 116 are vented by way of line 117, valve 120, and line 121. Optionally, at least a portion of the purge gas from line 121 may be used as fuel-gas where required for heating purposes in the system or for export, or the purge gas may be recycled to gas generator.

The crude methanol leaving separator 115 by way of line 136 contains water and about 2–5% of organic impurities The oxidizable impurities are removed in methanol purification zone 137. The crude methanol is treated first with a solution of comprising $H_2SO_4$ and $KM_nO_4$, then with a 25% solution of NaOH, and then filtered. By this means carbonyl formal, and acetal impurities are removed and leave by way of line 138.

The principal remaining impurities comprising dimethyl ether, mixed alcohols, and water are removed by two distillation steps. Thus, the crude methanol is passed through line 139, preheated in heat exchange 140 by indirect heat exchange with recycle water, and introduced into distillation column 141 by way of line 142. By distillation about 428 lbs/hr of dimethyl ether are removed from the top of column 141 by way of line 143, cooler 144, vessel 145, and lines 146–147. A portion of the dimethyl ether is mixed in line 148 with water from line 149 and recycled to column 141. All or a portion of the DME in line 147 may be recycled to gas generator 7 as a portion of the hydrocarbonaceous feed.

A bottom stream comprising methanol, water, and higher alcohols e.g. isobutanol, ethanol, n-amyl alcohol, and traces of other alcohols from tower 141 is passed through line 150 into fractionation tower 151. 39,701 lbs/hr of product methanol are taken off near the top of tower 151 with a purity in excess of 99.8% by way of line 155, cooler 156, tank 157, and lines 158 and 159. This stream may be then cooled and passed through activated carbon to remove residual impurities. A portion of the methanol product may be introduced into gas purification zone 16. Reflux methanol is returned to the column by way of line 160. 380 lbs/hr of mixed alcohols are drawn off of the tower through line 161. This stream may be subject to further separation of the constituents or returned at least in part to synthesis gas generator 7, as a portion of the feedstock. 3,603 lbs/hr of a bottoms stream comprising water with a slight amount of residual organics and soluble salts is removed from tower 151 by way of lines 162 and 163. A portion of this water stream is recycled to column 141 as the extractive medium by way of line 164. Alternatively, a portion of this water may be introduced into gas generator 7.

TABLE I

| | Line No. (Mole % Wet Basis) | | | | |
|---|---|---|---|---|---|
| | 60 | 86 | 94 | 102 | 101 |
| CO | 44.92 | 10.30 | 22.83 | 19.14 | 20.08 |
| $H_2$ | 38.32 | 30.87 | 68.43 | 68.39 | 68.89 |
| $CO_2$ | 3.55 | 13.80 | 7.00 | 8.13 | 7.68 |
| $H_2O$ | 10.71 | 43.71 | | | |
| $CH_4$ | 0.60 | 0.38 | 0.83 | 2.08 | 1.60 |
| A | 0.61 | 0.30 | 0.67 | 1.66 | 1.29 |
| $N_2$ | 0.22 | 0.11 | 0.24 | 0.60 | 0.46 |
| $H_2S$ | 1.01 | 0.52 | | | |
| COS | 0.06 | 0.01 | | | |

The process of the invention has been described generally and by example with reference to liquid hydrocarbon feedstocks, effluent synthesis gas streams and various other materials of particular compositions for purposes of clarity and illustration only. From the foregoing it will be apparent to those skilled in the art that the various modifications of the process and the materials disclosed herein can be made without departure from the spirit of the invention.

I claim:

1. A continuous process for producing methanol comprising: (1) reacting a hydrocarbonaceous or oxygenated hydrocarbonaceous feedstock by partial oxidation with a free-oxygen containing gas and optionally in the presence of a temperature moderator selected from the group consisting of $H_2O$, $CO_2$, $N_2$, flue gas, cooled off gas from an ore-reduction zone, a portion of cooled and recycled effluent gas from the synthesis gas generator, and mixtures thereof at an autogenous temperature in the range of about 1600° to 3500°F and a pressure in the range of about 20 to 450 atmospheres in the reaction zone of a free-flow unpacked noncatalytic synthesis gas generator to produce an effluent gas stream comprising $H_2$, CO, $CO_2$, and $H_2O$ and in mole % $H_2S$, 0–2; COS, 0–0.2; $CH_4$, 0.2–15; A, 0–2.0; $N_2$, 0–60; and entrained solids and ash; (2) removing entrained solids and ash from the effluent gas stream from (1) and introducing said gas stream in admixture with about 0.1 to 2.5 moles of supplemental steam per mole of effluent gas stream into a separate free-flow unpacked reaction zone at a pressure substantially that in said synthesis gas generator less ordinary line drop and at a temperature of at least 1500°F and reacting together $H_2O$ and CO in said mixture without a catalyst thereby increasing the mole ratio ($H_2$/CO) of the gas stream to a value in the range of about greater than 2.0 to 12; (3) cooling the effluent gas stream from (2) by indirect heat exchange with water thereby producing steam, optionally introducing a first portion of said steam into the synthesis gas generator in (1) as the H₂O temperature moderator, optionally mixing a second portion of said steam with the effluent stream in step (2) as said supplemental steam, and optionally introducing other portions of said steam into at least one steam turbine in the system as the working fluid; (4) intoducing the effluent gas stream from (3) into a gas purification zone and separating therefrom a process gas stream comprising principally H₂ and CO; (5) mixing 0 to 10 moles of a compressed recycle stream of unconverted gases produced subsequently in a methanol reaction zone with each mole of process gas stream from (4) to produce a methanol feed gas mixture; (6) preheating the methanol feed gas mixture from (5) to a temperature in the range of about 400° to 750°F by indirect heat exchange with an effluent stream leaving said methanol reaction zone; (7) introducing the preheated feed gas stream from (6) into said methanol reaction zone, and reacting together H₂ and CO while in contact with a methanol catalyst at substantially the same pressure as that in said synthesis gas generator less ordinary drop in the line and equipment to produce said effluent stream from the methanol reaction zone comprising methanol, unconverted gases, H₂O, and liquid impurities selected from the group consisting of dimethylether, mixed alcohols, aldehydes, ketones, and mixtures thereof, (8) separating a separate stream of said unconverted gases from the effluent stream from the methanol reaction zone; (9) compressing at least a portion of the stream of unconverted gases from (8) and introducing said stream into (5) as said compressed stream of unconverted gases; (10) separating said liquid impurities and a separate stream of methanol from the effluent stream from the methanol reaction zone; and (11) introducing at least a portion of said liquid impurities into said synthesis gas generator in (1) as at least a portion of said feedstock.

2. The process of claim 1 wherein the methanol catalyst in step (4) is selected from the group consisting of zinc oxide, copper oxide, and mixtures thereof plus a promoter selected from the group of oxides consisting of chromium, magnesium, aluminum, and mixtures thereof.

3. The process of claim 1 wherein said free-oxygen containing gas is substantially pure oxygen (95 mole percent O₂ or more).

4. The process of claim 1 wherein said hydrocarbonaceous feedstock is selected from the group consisting of liquefied petroleum gas, petroleum distillates and residua, naphtha, gas oil, residual fuel, reduced crude, whole crude, asphalt, coal tar, coal oil, shale oil, tar-sand oil, and pumpable slurries of coal, particulate carbon, and petroleum coke in water or in a liquid hydrocarbon fuel, and mixtures thereof.

5. The process of claim 1 wherein said hydrocarbonaceous feedstock is selected from the group consisting of methane, propane, natural gas, water-gas, coke-oven gas, synthesis gas, refinery gas, and mixtures thereof.

6. The process of claim 1 wherein said hydrocarbonaceous oxygenated feedstock are organic materials selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

7. The process of claim 1 wherein the process gas stream from step (4) also contains from about 1 to 12 mole percent CO₂.

8. The process of claim 1 wherein at least a portion of the unconverted gases from step (8) are recycled to the synthesis gas generator of step (1).

9. The process of claim 1 with the added step of mixing a stream of supplemental hydrogen rich gas with the process gas stream from (4) to increase the mole ratio (H₂/CO).

10. The process of claim 1 wherein the process gas stream from step (4) comprises principally H₂, CO, and CO₂, and the mole ratio (H₂/2CO + 3CO₂) is less than 1.05 and greater than 1.01.

11. The process of claim 1 where in the methanol reaction zone in step (7) the pressure is in the range of about 20 to 110 atmospheres, the temperature is in the range of about 400° to 700°F., and the catalyst consists of a mixture of copper, zinc, and chromium oxides with the following ranges of atomic percentages; copper, 90 to 20; zinc, 8 to 60; and chromium, 2 to 30.

12. The process of claim 1 where the pressure in the methanol reaction zone in step (7) is in the range of about above 200 to 400 atmospheres, the temperature is in the range of about 570° to 750°F., and the catalyst comprises approximately in weight percent, zinc oxide 89 and chromium oxide 11.

13. The process of claim 1 where a portion of the methanol from step (8) is introduced into the gas purification zone of step (4) as make-up solvent for selective absorption of at least a portion of the gaseous impurities in the effluent gas stream from (3).

14. The process of claim 1 where in step (7) the methanol catalyst comprises principally copper-aluminum-zinc, the pressure in the methanol reaction zone is in the range of about 40 to 100 atmospheres, and the space velocity is in the range of about 10,000 to 50,000 standard cubic feet per cubic foot of catalyst per hour.

15. The process of claim 1 where in step (5) 3 to 8 moles of said compressed recycle stream of unconverted gases are mixed with each mole of process gas stream from step (4).

16. The process of claim 1 wherein the methanol feed gas stream reacted in step (7) includes CO₂ in the range of greater than 8–less than 12 mole %.

17. A continuous process for producing methanol comprising: (1) reacting a sulfur-containing hydrocarbonaceous feedstock by partial oxidation with substantially pure oxygen in the presence of H₂O as a temperature moderator at an autogenous temperature in the range of about 1600° to 3500°F and a pressure in the range of about 205 to 450 atmospheres in the reaction zone of a free-flow unpacked noncatalytic synthesis gas generator to produce an effluent gas stream comprising H₂, CO, CO₂, and H₂O and in mole % H₂S, 0–2; COS, 0–0.2; CH₄, 0.2–15; A, 0–2.0; N₂, 0–60; and entrained particulate carbon and other solids; (2) quenching all of the effluent gas stream from step (1) in a quench zone with H₂O thereby cooling said gas stream to a temperature in the range of about 400° to 900°F and removing entrained particulate carbon and other solids while vaporizing into said gas stream about 0.1 to 2.5 of supplemental H₂O per mole of effluent gas stream from (1), and reheating the gas stream from said quench zone to a temperature greater than 1500°F. (3) introducing the effluent gas stream from (2) into a separate free-flow unpacked reaction zone at a pressure substantially that in said synthesis gas generator less ordinary line drop and at a temperature in the range of about 1500° to 2800°F and reacting together $H_2O$ and CO in said gas stream without a catalyst thereby increasing the mole ratio ($H_2/CO$) of the gas stream to a value in the range of about greater than 2.0 to 12; (4) cooling the effluent gas stream from (3) by indirect heat exchange with water thereby producing steam, introducing a first portion of said steam into the synthesis gas generator in (1) as the $H_2O$ temperature moderator, and introducing separate portions of said steam into at least one steam turbine in the system as the working fluid; (5) introducing the effluent gas stream from (4) into a gas purification zone at substantially the same pressure as that in said synthesis gas generator less ordinary line drop, and obtaining therefrom a process gas stream comprising principally $H_2$ CO; and CO: (6) mixing 3 to 8 moles of compressed recycle stream of unconverted gases produced subsequently in a methanol reaction zone with each mole of process gas stream from (5) to produce a methanol feed gas mixture; (7) preheating the methanol feed gas mixture from (6) to a temperature in the range of about 400° to 750°F by indirect heat exchange with an effluent stream leaving said methanol reaction zone; (8) introducing the preheated feed gas stream from (7) into said methanol reaction zone, and reacting together $H_2$ and CO while in contact with a methanol catalyst comprising zinc and chromium oxides with 0.5 to 1.5 chromium atoms per atom of zinc and a promoter selected from the group consisting of magnesium, iron, and manganese at a temperature in the range of about 570° to 750°F and a pressure in the range of about 200 to 400 atmospheres and at substantially the same pressure as that in said synthesis gas generator less ordinary drop in the line and equipment to produce said effluent stream from the methanol reaction zone comprising methanol, unconverted gases, $H_2O$ and liquid impurities selected from the group consisting of dimethylether, isobutanol, ethanol, acetone, aldehydes and mixtures thereof; (9) separating a stream of said unconverted gases from the effluent stream from the methanol reaction zone; (10) compressing at least a portion of the stream of unconverted gases from (9) and introducing said stream into (6) as said compressed stream of unconverted gases; and (11) separating said liquid impurities and a separate stream of methanol from the effluent stream from the methanol reaction zone; and (12) introducing at least a portion of said liquid impurities into said synthesis gas generator in (1) as at least a portion of said hydrocarbonaceous feedstock.

18. In the continuous process of manufacturing methanol from a gas mixture principally comprising $H_2$, and CO prepared by the partial oxidation of a hydrocarbonaceous or oxygenated hydrocarbonaceous fuel with substantially pure oxygen in the presence of $H_2O$ at an autogenous temperature in the range of about 1600° to 3500°F in the reaction zone of a free-flow unpacked noncatalytic synthesis gas generator to produce an effluent gas stream principally comprising $H_2$ and CO; reacting $H_2O$ and CO in the process gas stream by water-gas shift reaction to produce a feed gas stream comprising $H_2$ and CO; and reacting said feed gas stream in a catalytic methanol reaction zone to produce an effluent stream comprising methanol: the improvement which comprises reacting said hydrocarbonaceous or oxygenated hydrocarbonaceous fuel in said synthesis gas generator at a pressure to the range of about 20 to 450 atmospheres to produce an effluent gas stream comprising $H_2$, CO, $CO_2$, and $H_2O$, and in mole % $H_2S$, 0–2; COS 0–0.2; $CH_4$, 0.2–15; A, 0–2.0; $N_2$, 0–60; and entrained solids; removing said entrained solids; introducing about 0.1 to 2.5 moles of supplemental steam per mole of effluent gas and adjusting the $H_2/CO$ mole ratio of said process gas stream by noncatalytic water-gas shift reaction between $H_2O$ and CO contained therein at a temperature in the range of about 1500° to 2800°F; removing impurities from the process gas stream to produce a feedstream principally comprising $H_2$ and CO, and containing $CO_2$ in the amount of about 2 to 12 mole percent; introducing said feedstream into said catalytic methanol reaction zone at a temperature in the range of about 400° to 750°F and a pressure in the range of about 20 to 450 atm. to produce an effluent stream comprising methanol, unconverted gases, $H_2O$, and organic liquids containing combined oxygen selected from the group consisting of dimethyl ether, mixed alcohols, aldehydes, ketones, and mixtures thereof; separating a stream of said unconverted gases, a stream of said organic liquids containing combined oxygen, and a stream of methanol, from said effluent stream of materials produced in said methanol reaction zone; and feeding a stream of said unconverted gases or a separate stream of said organic liquids containing combined oxygen, or both of said streams into said synthesis gas generator as a portion of the feed; and wherein the pressure in all steps in the process through the methanol reaction zone is substantially the same as that in the synthesis gas generator, less ordinary line drop.

* * * * *

UNITED STATES PATENT AND TRADEMARK OFFICE
CERTIFICATE OF CORRECTION

PATENT NO. : 3,920,717
DATED : November 18, 1975
INVENTOR(S) : CHARLES P. MARION It is certified that error appears in the above-identified patent and that said Letters Patent are hereby corrected as shown below:

| | |
|---|---|
| Column 4, line 62 | Change "preferably" to --Preferably--. |
| Column 6, line 6 | Change "On" to --Or--. |
| Column 6, line 56 | Change "COs" to --COS--. |
| Column 9, line 3 | Change "$CH_3oH$" to --$CH_3OH$--. |
| Column 12, line 59 | Change "into" to --intro--. |
| Column 17, line 17 | After "$H_2$" insert --and--. |
| Column 17, line 18 | Before "(6)" delete "and CO;" |

Signed and Sealed this

Thirteenth Day of June 1978

[SEAL]

Attest:

RUTH C. MASON
Attesting Officer

DONALD W. BANNER
Commissioner of Patents and Trademarks